(12) United States Patent
Guehne

(10) Patent No.: US 9,784,613 B2
(45) Date of Patent: Oct. 10, 2017

(54) SENSOR FOR DETECTING AND LOCALISING LASER BEAM SOURCES

(71) Applicant: Airbus Defence and Space GmbH, Ottobrunn (DE)

(72) Inventor: Tobias Guehne, Munich (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 51 days.

(21) Appl. No.: 14/441,707

(22) PCT Filed: Nov. 6, 2013

(86) PCT No.: PCT/DE2013/000656
§ 371 (c)(1),
(2) Date: May 8, 2015

(87) PCT Pub. No.: WO2014/075652
PCT Pub. Date: May 22, 2014

(65) Prior Publication Data
US 2015/0285678 A1 Oct. 8, 2015

(30) Foreign Application Priority Data
Nov. 14, 2012 (DE) .................. 10 2012 022 258

(51) Int. Cl.
*H01J 5/16* (2006.01)
*G01J 3/02* (2006.01)
(Continued)

(52) U.S. Cl.
CPC ........... *G01J 3/0229* (2013.01); *G01J 1/0407* (2013.01); *G01J 1/0411* (2013.01); *G01J 1/4257* (2013.01); *G01S 3/784* (2013.01); *G01S 7/4804* (2013.01)

(58) Field of Classification Search
CPC ....................................................... G01S 7/4804
(Continued)

(56) References Cited

U.S. PATENT DOCUMENTS

| 5,227,859 A | 7/1993 | Leib et al. |
| 6,118,119 A | 9/2000 | Ruschin |
| 2010/0001119 A1* | 1/2010 | Lindgren ............... F41G 7/226 244/3.16 |

FOREIGN PATENT DOCUMENTS

| DE | 198 51 010 A1 | 6/2007 |
| DE | 10 2007 024 051 A1 | 11/2008 |
| DE | 10 2011 015 478 A1 | 10/2012 |

OTHER PUBLICATIONS

International Search Report (PCT/ISA/210) dated Apr. 23, 2014, with English translation (Six (6) pages).

(Continued)

*Primary Examiner* — Thanh Luu
(74) *Attorney, Agent, or Firm* — Crowell & Moring LLP

(57) ABSTRACT

A sensor for detecting and localizing laser beam sources, includes a beam-sensitive detector which is arranged in the image field of an imaging optic, an electric image processing device which is connected to the detector, and an optical diffraction element which is arranged in the beam path. The diffraction properties of the optical diffraction element are such that incident laser light on different wavelength bands produce diffraction patterns with different shapes, and the electronic image processing device is designed such that it can detect and evaluate the different forms of the diffraction pattern.

3 Claims, 2 Drawing Sheets

Band 1       Band 2

(51) Int. Cl.
G01S 3/784 (2006.01)
G01S 7/48 (2006.01)
G01J 1/42 (2006.01)
G01J 1/04 (2006.01)

(58) Field of Classification Search
USPC .................................................. 250/237 G
See application file for complete search history.

(56) References Cited

OTHER PUBLICATIONS

Bengtsson, "Kinoforms designed to produce different fan-out patterns for two wavelengths", Applied Optics, vol. 37, No. 11, Apr. 10, 1998, pp. 2011-2020, (Ten (10) pages).

* cited by examiner large wavelength      small wavelength

Band 1      Band 2

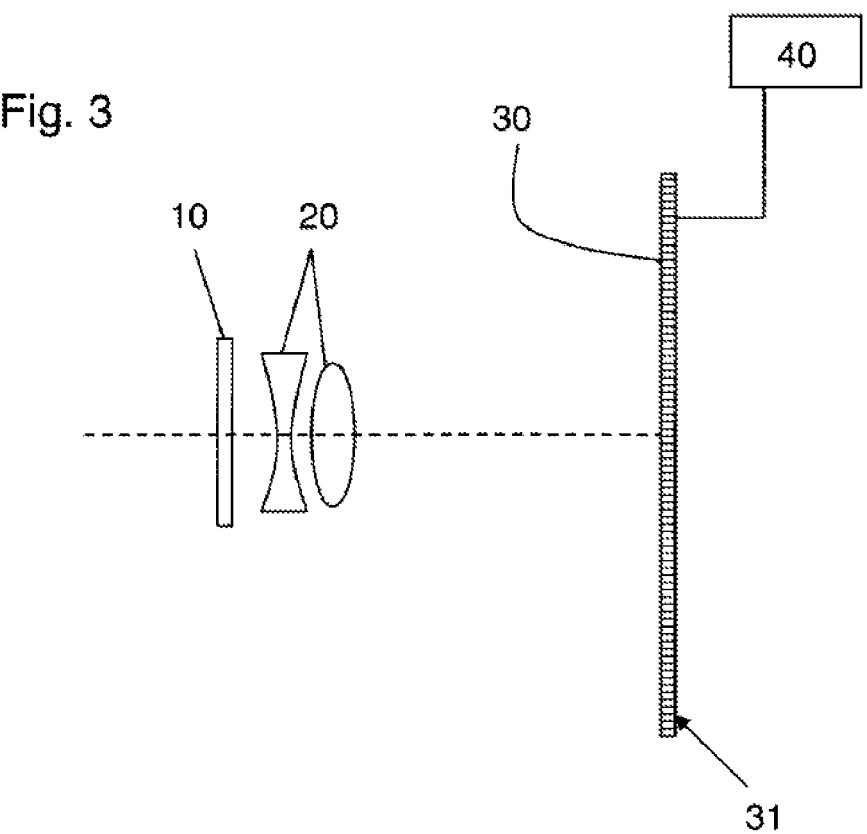

SENSOR FOR DETECTING AND LOCALISING LASER BEAM SOURCES

BACKGROUND AND SUMMARY OF THE INVENTION

The invention relates to a sensor for detecting and localizing laser radiation sources having a radiation-sensitive detector arranged in the image field of an imaging optical unit, an electronic image processing device connected to the detector, and an optical diffraction element arranged in the beam path.

Laser apparatuses are used in the military field for various purposes. To protect and to initiate countermeasures, sensors which can detect and localize laser sources early and reliably are necessary. Such sensors are known, for example, from the applications DE 33 23 828 C2 and DE 35 25 518 C2, which are used to detect and localize pulse laser sources such as those that are used, for example, for distance meters, target illuminators or blinding lasers, and from EP 0283538 A1, which can additionally also detect the radiation of modulated continuous beam lasers, for example from laser beam waveguide weapons.

In the further patent application DE 102007024051 A1, optical diffraction elements are integrated in an optical unit and are used for detecting laser radiation. The resulting diffraction image is imaged onto an image field matrix. The optical diffraction element here provides for the diffraction of all incident optical radiation into a plurality of orders. Each wavelength is diffracted at a different angle which increases with the wavelength. Here, the coherent light of a laser is diffracted into a point pattern, while incoherent broadband light is widened spectrally and forms strips in the image plane that radially lead away from the undiffracted image point of the light source (zeroth order). The point pattern produced by the laser radiation (for example in the form of a grid) scales in terms of its size (for example spacing of the grid points) with the wavelength.

The diffraction image is identified using image evaluation algorithms. In this way, laser sources from spectrally broadband sources can be differentiated. Additionally, it is possible to determine the position and wavelength of the laser from the position of the diffraction orders on the image field matrix, that is to say (x,y) pixel coordinates, and from the point spacing of the diffraction arrangement orders.

The fact that the diffraction pattern increases in size in dependence on the wavelength has, however, significant disadvantages for the system design of a sensor for detecting laser radiation sources. This will be explained in more detail with reference to FIG. 1. Illustrated are two grid-like diffraction patterns consisting of, in each case, nine points, which are imaged in each case on the image field matrix 31 of a detector 30. The left-hand image shows the diffraction pattern at maximum laser wavelength, the right-hand image at minimum wavelength (the terms "minimum" and "maximum" refer to the operative wavelength range of the sensor). The region of the field of vision 35 of the sensor represents that section of the detector in which the zeroth order of the laser source in the scene to be monitored can lie and still leaves a complete diffraction image on the detector 30 for all wavelengths of the relevant wavelength range.

As can be seen from FIG. 1, the central non-hatched region of the detector would suffice for illustrating the complete diffraction image on incidence of the maximum wavelength. The surrounding hatched region of the image field matrix is additionally necessary in order to be able to image the complete diffraction pattern for all laser wavelengths that lie in the field of vision 35 of the sensor.

What can be seen is that the ratio between the field of vision of the sensor and the total area of the image field matrix continues to be reduced the greater the selected spectral operating range of the sensor.

If the condition is set that the area for the imaging of the field of vision 35 of the sensor must not be smaller than a minimum area, the total area of the detector must correspondingly be increased in size as a consequence in order to make it possible for a large spectral range to be covered.

The result is that the image field matrix must be configured to be correspondingly large so as to cover the entire bandwidth of the relevant wavelengths. The field of vision 35 of the sensor uses only a small section of the entire image field matrix, and the rest of the detector surface must be kept for imaging the diffraction orders. The greater the spectral range is that the sensor is intended to cover, the greater becomes the proportion that is not usable for the field of vision.

Optical diffraction elements that are used are, among others, phase holograms, what are known as kinoforms. EP 1 770 349 A1 describes for example the use of such kinoforms in a laser-supported target viewfinder. Kinoforms impart a phase modulation onto the incident light, which phase modulation results in the desired interference pattern in the image plane. The holograms are etched into optical glass substrates. The path difference of the light when traveling through the structured surface ensures a phase shift which effects destructive or constructive interference to produce the desired light distribution in the image plane. On account of the dispersion of the glass substrates, such diffraction elements only operate at optimum level for a fixed design wavelength such that they can be used in a meaningful manner with respect to the optical performance and the size of the diffraction pattern only within a relatively limited spectral operating range.

The publication by J. Bengtsson "Kinoforms designed to produce different fan-out patterns for two wavelengths," in APPLIED OPTICS, 10 Apr. 1998 Vol. 37, no. 11, describes the implementation of kinoforms which produce two different diffraction images as a function of the wavelength. The operating principle of a kinoform is the wavelength-specific phase modulation which results in the desired interference pattern in the image plane. Therefore, such a diffractive optical element functions at an optimum level only for a design wavelength. If the wavelength used differs strongly from the design wavelength, this necessarily influences the diffraction image. It not only scales with the wavelength, but the spatial distribution of the constructive and destructive interference also changes. This ultimately has the result that the energy distribution in the image plane changes. Two physical principles to which the cited publication refers are crucial for this: if the very small difference in dispersion is ignored, the period length changes with the wavelength. In addition, after passage through the kinoform, the phase shift is dependent on the wavelength. In conventional kinoforms, these are rather undesired effects, but in the cited publication these principles are used in a targeted fashion so as to differentiate, using optical diffraction elements, light of different wavelengths and colors (in the visible range). In this publication, various methods are considered for using these physical principles for the design of kinoforms. A differentiability between different colors and spectral bands is made possible.

The invention is based on the object of providing a sensor apparatus which can have a compact design and can be used over a broad spectral operating range.

This object is achieved in accordance with embodiments of the invention.

According to one embodiment of the invention, the spectral operating range of the sensor is divided into a plurality, for example two, spectral operating ranges. To this end, the optical diffraction element, in particular a kinoform, is designed such that it produces different diffraction patterns in the different wavelength bands. That is to say, it not only changes the size of a diffraction pattern in dependence on the wavelength, but with the transition into a new wavelength band, the form of the diffraction pattern itself changes.

Each diffraction pattern for itself scales with respect to its size—as in the known diffraction elements—with the wavelength of the laser. The determination of the laser wavelength therefore continues to be possible.

The surface structures of the optical diffraction element required for the invention can be etched in a conventional manner into substrate materials, i.e. e.g. glass substrates, and can thus also be produced in greater numbers.

Particularly advantageously, the diffraction element is designed such that the spacings between the individual diffraction orders do not, or only slightly, change even in high wavelength bands. The extent of the diffraction patterns thus remains approximately the same size in all wavelength bands. The maximum and minimum extents of each diffraction pattern should advantageously approximately match for all wavelength bands. Moreover, the wavelength-dependent change of the extent within the same wavelength band can also be set to be relatively low.

With these measures, the portion of the detector surface that is not usable for the field of vision of the sensor is minimized over the entire operative wavelength range of the sensor, and the stated disadvantage of the conventional optical diffraction elements is eliminated.

As a result, a compact laser sensor is implemented which can be used over a broad spectral operating range.

With the solution according to the invention, the wavelength can thus be coded with two parameters:
  a) by the diffraction pattern produced;
  b) by the spacing of the diffraction orders within the diffraction pattern.

The different diffraction patterns and the spacing of the individual diffraction orders can be detected using an image processing system.

The invention has the following further advantage:

if the intention is to design a kinoform for a large spectral operating range, this generally leads to a drop in the optical properties the more the used wavelength differs from the determined design wavelength. In concrete terms this means that the efficiency of the diffraction of the laser light into the diffraction orders experiences a severe drop and thus the light yield for laser light strongly decreases. Correspondingly, this makes the detection of the laser more difficult in the subsequent processing chain. With the division according to the invention into a plurality of spectral operating ranges, this general disadvantage of known sensors is overcome because now such a design wavelength is available for each wavelength band, which permits the production of a diffraction image with optimum yield in the diffraction orders in the respective band.

BRIEF DESCRIPTION OF THE DRAWINGS

The invention will be explained with respect to concrete exemplary embodiments with reference to figures, in which:

FIG. 3 illustrates a cross section through an apparatus according to an embodiment of the invention.

DETAILED DESCRIPTION OF THE DRAWINGS

Figure 1:
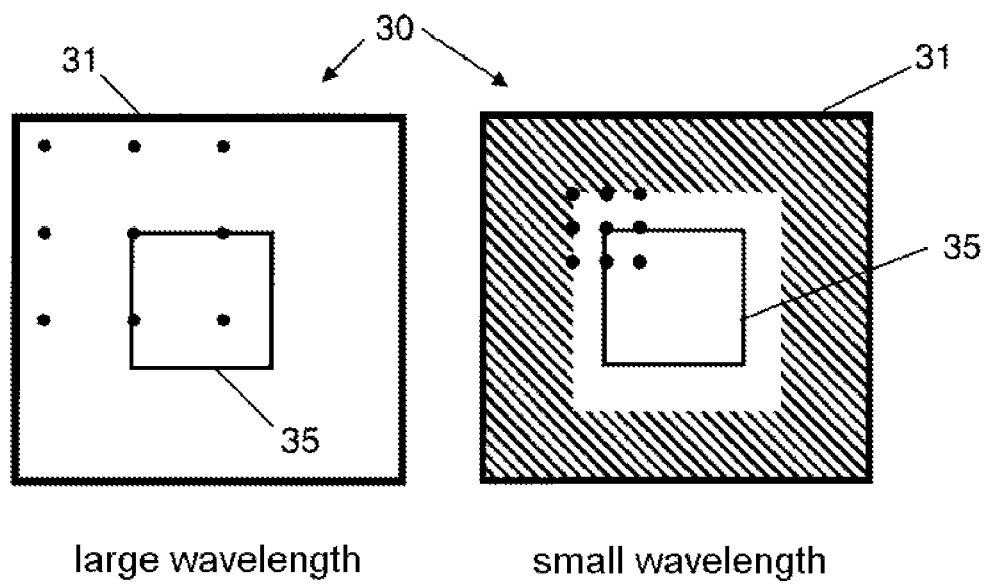
FIG. 1 illustrates the diffraction image of a conventional optical diffraction element at minimum and maximum wavelengths, as described in the introduction of the description.
Figure 2:
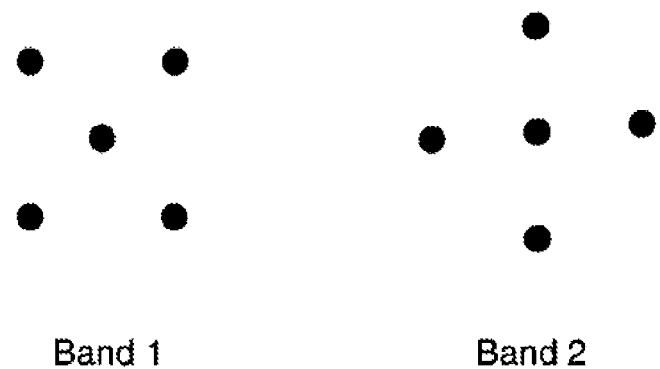
FIG. 2 illustrates two different diffraction images from different wavelength bands according to an embodiment of the invention.

FIG. 2 shows an example of the production of two different diffraction patterns in two different wavelength bands (not to scale with FIG. 1). These are intended to be produced with the same diffraction element. The two diffraction patterns differ from one another in that they are rotated with respect to one another by 45° about the axis of symmetry. An image processing system recognizes this rotation and associates the diffraction patterns with the respective wavelength band. Moreover, it is possible to determine the laser wavelength by using the spacing of the diffraction orders within the diffraction pattern. What can also be seen is that, although the diffraction patterns were produced at different wavelengths, the extent of the diffraction patterns remains the same.

The solution according to the invention is associated with a change in the geometry of the diffraction patterns, in delineation to a pure change in size. For example, different symbols, numbers, digits, etc. can be used for the different wavelength bands. It would also be possible to vary the number of image points in a point grid.

FIG. 3 shows, by way of example, the construction of an apparatus according to an embodiment of the invention. It includes in the beam path an optical diffraction element 10 in front of a standard optical unit 20 and a detector 30 with an image field matrix 31. The detector 30 is connected to an image processing device 40 which detects the diffraction patterns produced by the diffraction element 10 on the image field matrix 31 and associates it with a specific wavelength band.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A sensor for detecting and localizing laser radiation sources, comprising:
   a radiation-sensitive detector arranged in an image field of an imaging optical unit;
   an electronic image processing device coupled to the radiation-sensitive detector; and
   an optical diffraction element arranged in a beam path, wherein
   diffraction properties of the optical diffraction element are designed such that incident laser light in different wavelength bands produces diffraction patterns of different forms, wherein the different forms of the diffraction patterns that are associated with individual wavelength bands differ by way of a rotation about a same axis of rotation,
   the electronic image processing device is configured to detect and evaluate the different forms of the diffraction patterns, and the diffraction properties of the optical diffraction element are configured such that:
   a size of the diffraction pattern at a maximum wavelength of a wavelength band is substantially the same for all wavelength bands, and
   a size of the diffraction pattern at a minimum wavelength of a wavelength band is substantially the same for all wavelength bands.

2. The sensor according to claim 1, wherein the axis of rotation is an axis of symmetry.

3. The sensor according to claim 1, wherein the optical diffraction element is a kinoform.

* * * * *